June 8, 1965     W. W. EUKEL     3,188,469
RADIATION DOSAGE MEASUREMENT OF IRRADIATED MATERIAL
Filed July 16, 1957
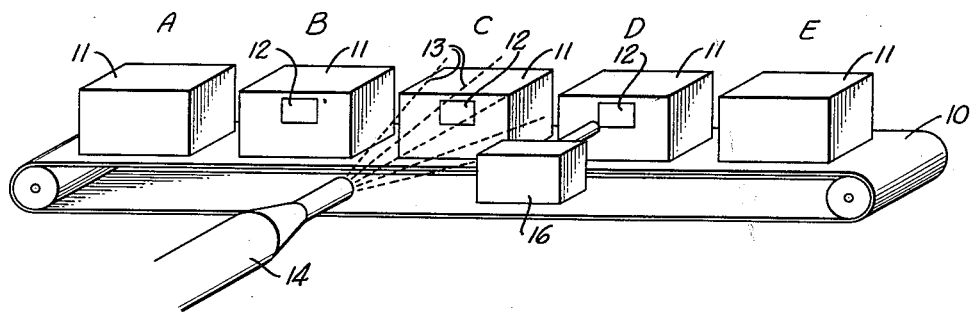
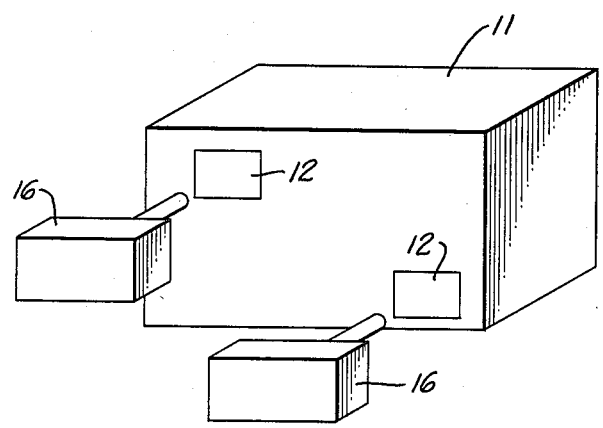
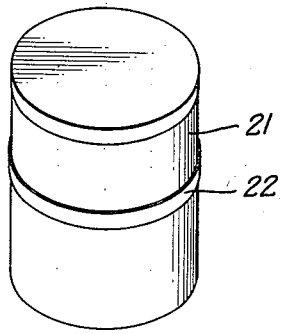
INVENTOR.
Warren W. Eukel
BY
William D. Hager
ATTORNEY.

United States Patent Office  3,188,469
Patented June 8, 1965

3,188,469
RADIATION DOSAGE MEASUREMENT OF IRRADIATED MATERIAL
Warren W. Eukel, Walnut Creek, Calif., assignor, by mesne assignments, to High Voltage Engineering Corporation, Burlington, Mass., a corporation of Massachusetts
Filed July 16, 1957, Ser. No. 672,313
The portion of the term of the patent subsequent to Feb. 22, 1982, has been disclaimed
4 Claims. (Cl. 250—83)

The present invention relates to improved and simplified method and means for radiation dosage measurements.

The wide applicability of ionizing radiation in the fields of food and drug sterilization and pasteurization and further applications of same as a catalyst in industrial processes raises the need not only for particular radiation sources but also for a wide variety of radiation sources but also for a wide variety of radiation measuring means. In keeping with this growing demand there have been developed numerous types of dosimeters or devices for measuring radiation dosage, however; the majority of these devices are designed for experimental work or for health safety monitoring and are not well suited to mass production methods of dosimetry. For example, in the sterilization of foodstuffs in bulk by irradiation thereof with such as gamma or electron beams, radiation control or checking is required on a large scale. One of the prerequisites for radiation monitoring on a large scale is simplicity and low cost, as the radiation process must be capable of accomplishment by relatively untrained personnel and must be economically competitive with other processes producing similar results. Maintenance of equipment is another factor of importance so that expensive and complicated electronic devices must be minimized in any feasible dosimeter system.

Additional possibilities for improvement are to be found in the monitoring of industrial radiation processes, for with a production line of fixed components wherein human safety is not in question a system of pass and fail grading may be established. Such a system may be materially simplified over conventional measuring systems designed to provide accurate dosage readings over a wide range.

The present invention contemplates the provision of a simplified method and means for checking the radiation dosage received by a product or employed in a process. In accordance with this invention advantage is made of the particular reactions of certain materials to radiation so that by positioning selected materials in proximity with a product or process wherein radiation is purposely introduced and observing the irradiated material a check is performed on the radiation dosage.

It is an object of the present invention to provide improved method and means for radiation dosimetry.

It is another object of the present invention to provide an inexpensive and uncomplicated method of checking radiation dosage received by quantities of materials.

It is a further object of the present invention to provide a method of indicating radiation dosage received by the use of materials that retain the indication for a short period after irradiation.

A still further object of the present invention is to provide an improved package having the property of limited radioactivity following package irradiation.

Yet another object of the present invention is to provide a pass or fail method of checking irradiation of material in large quantity with very low cost.

Various other possible objects of the invention and advantages thereof will become apparent from the following description of the invention taken together with the accompanying drawing, wherein:

FIGURE 1 is a schematic representation of steps in the invention,
FIGURE 2 shows an alternative to certain steps of FIGURE 1, and
FIGURE 3 is a view of a packaged material adapted for irradiation detection and measurement.

Considering now the invention in general, the method thereof embraces the purposeful introduction in a radiation field employed for irradiating materials or processes, of a selected substance which will undergo induced radioactivity in the desired radiation field. Following exposure of samples of such selected substances to the radiation field they are subsequently monitored or measured to determine whether the sample and thus the material being irradiated has received a desired quantity of radiation to effect the desired result.

It has been found that certain factors are of particular importance as regards the selection of sample substances. Thus in order for the method to have sufficient flexibility for practical usage various substances having different energy levels for induced radiation are required and further for a large proportion of activities it is required that sample substances be employed which become radioactive at relatively low level energy irradiation. Ease and accuracy of measuring the induced radioactivity require that the sample substances have a high specific activity and for convenience of handling and safety it is preferable that the half-life of induced radioactivity be relatively short and yet long enough for convenient measurement.

Research has shown that certain metastable isotopes are highly advantageous for use as samples for introduction in a radiation field with irradiated material and subsequent radiation measurement. A typical radiation reaction with a metastable isotope of gold is:

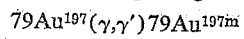

$$79Au^{197}(\gamma,\gamma')79Au^{197m}$$

and this particular isotope has a threshold for induced gamma ($\gamma$) radiation at about one milion electron volts of energy and a half-life of 7.5 seconds. While in this example the half-life will be seen to be too short for most applications yet the general possibilities may be seen in that gamma radiation is induced at a low threshold.

Of greater practical value are isotopes of indium, rhodium and cadmium for they have half-lives of 4.5 hours, 57 minutes, and 48.6 minutes, respectively, whereby measurement or detection of the induced radiation is facilitated and yet the hazard of long lived radioactivity is minimized. Each of the above noted substances have a threshold for induced radioactivity in the vicinity of one milion electron volts so as to fall directly within a range of great interest in the irradiation of foodstuffs, for example.

Various other substances may also be employed as the sample material in the present invention, however, the metastable isotopes including certain silver isotopes not noted above are preferred for low energy applications as the thresholds thereof are generally substantially lower than other substances. As a further example of a substance that may be herein employed, an isotope of zinc produces the following reaction:

$$30Zn^{70}(\gamma,\eta)30Zn^{69}$$

wherein the threshold energy is 9.2 million electron volts, the half-life is 52 minutes and the resultant radioactive isotope decays with emission of beta ($\beta^-$) rays. A table of elements suitable for use in the present invention is included at the end of this description and while not exclusive of other elements it provides a guide for choosing a sample substance suited for particular applications wherein radiation of differing energy levels may be employed and detection circumstances indicate the desirability of different length half-lives and/or different decay emission.

Proceeding with a description of the method of the invention and referring to FIGURE 1 of the drawings, there is shown at A thereof a packaged material as in a can, carton or the like 11 which is to be irradiated as for the sterilization of the material. There is, as shown at B, attached to or located in proximity with the package 11 a sample 12 of material chosen to have a threshold for induced radioactivity just below the radiation dosage to be applied to the package. The package 11 is then passed through the beam 13 from a radiation source 14 such as, for example, a conventional high energy linear accelerator producing a penetrating electron or X-ray beam. Any desired type of irradiating beam and source therefor may of course be employed and in any particular application the incident beam energy is controlled to provide the desired results in the irradiated material. As to possible physical structure associated with the method there may be employed package moving means such as a conveyor belt 10 and appropriate beam sweeping means associated with the source 14 so that each portion of the material in the package will receive equal irradiation. The packaged irradiated material is then moved out of the radiation beam following the calculated proper exposure thereto and passed by a counter 16 located adjacent the package path, as shown at D of FIGURE 2 and having if desired a probe extending close to the sample. Upon this single counter there is indicated the induced radioactivity of the sample 12 as a direct measure of the radiation dosage received by the packaged material. With the proper choice of sample element or isotope thereof so that the threshold for induced radiation thereof is slightly below the desired package irradiation the counter 16 need comprise only a radiation detector of very simple and conventional structure adapted to indicate the presence of induced radiation in the sample as no measure of the magnitude of induced radiation in the sample is ordinarily required. Further, there may be affixed to the package two samples having different theshholds for induced radiation, one above and one below the desired material irradiation level and disposed in spaced relation with one or more counters or detectors located to separately indicate at least the presence of induced radiation in the two samples, as shown in FIGURE 2. In this manner a proper range of material irradiation is established when the low threshold sample is induced to radioactivity and the higher threshold sample is not induced to radioactivity. One further step may be included in the method and that is the removal from the package of the sample and this may be done prior to or following the foregoing step of detecting the radioactivity of the sample and as the sample is chosen to have a limited half-life of radioactivity the sample may be shortly re-employed by attachment to another package of material before irradiation thereof. Alternatively the sample may be left on or in the package as the short half-life thereof precludes any possibility of danger therefrom at some future date when the packaged material is handled and used.

The above described method will be seen to require a minimum of equipment particularly in view of the simple detector that may be employed therein as contrasted to conventional complicated and costly counting equipment conventionally employed to monitor radiation beams. Additionally, the package 11 may in fact be quite large so as to encompass material in bulk, as for example a freight car loaded with such a flour and maximum advantage is attained in such instance. In the monitoring of bulk material irradiation more than one sample may if desired be positioned in or on the package to check the level of irradiation at a plurality of points therein for accurate quality control of the material.

As an adjunct to the above described method of irradiation monitoring or checking there is provided an improved package for material to be irradiated as shown in FIGURE 3. As illustrated, a package 21 is formed of any convenient size and shape, as for example cylindrical and having formed integral therewith a substance 22 that is susceptible to radiation for becoming itself radioactive. This substance is chosen for certain properties noted above, i.e., relatively short half-life of induced radioactivity, a high activity level, and a threshold for induced radioactivity in accordance with the particular radiation dosage to be applied to the material contained in the package. As to the manner of joinder of this substance to the package, a large number of possibilities exist and the choice thereof is in part dependent upon the package material and the process of forming the package or the process of packaging materials therewith. Thus for conventional "tin cans" so widely employed in the final packaging of foodstuffs the substance 22 may be formed as a wafer or band and affixed to the can in permanent relationship. One of the major advances in food and drug processing lies in the irradiation of same for sterilization and thus purification and prevention of spoilage. With materials so sterilized the necessity of conventional rigid containers as of metal is precluded so that plastic, for example, in rigid or flexible form may be employed for packaging such as foodstuffs. In this type of packaging the substance 22 may be introduced into the packaging film during processing and forming of same either as a separate wafer or as a dispersion throughout a liquid phase of the plastic whereby the final package integrally includes the substance as a part thereof. At least one further possibility lies in the provision of the substance 22 in the package closure means such as a rigid top or a tie and also the substance may be localized in the package so as to minimize the amount thereof required, this being accomplished, for example by integration in a plastic container top. The substance to be irradiated may, for example, be included in the top, bottom or induction heating-tape of a sealed plastic container. Whatever the mode employed for introducing the substance into or onto the package it is necessary to employ a substance having the desired threshold for induced radiation. Also where the substance is formed integral with or designed to remain with the package to ultimate consumption of the packaged material it is important to employ a substance having no long lived radioactivity so that no possible radiation hazard may result to those handling and using the packaged material. As previously noted, a number of different elements and isotopes thereof are well suited for this use and there follows a table of such elements and isotopes including a relatively wide range of threshold energies, half-lives, and emission particles although it is to be understood that the listing in the table is not exclusive.

While the salient features of this invention have been described in detail with respect to certain embodiments thereof, it will of course be apparent that certain modifications may be made within the spirit and scope of this invention, and it is not desired therefore to limit the invention to the exact details shown except insofar as they may be defined in the following claims.

*Photoneutron activities with threshold below 10 mev. and leading to short half-lives*

| Target | $\gamma$, n threshold | T ½ | Radiation |
|---|---|---|---|
| 30 Zn$^{70}$ | 9.2 mev | 52 M | $\beta-$ |
| 38 SR$^{86}$ | 9.5 | 65 D | K |
| 45 RH$^{103}$ | 9.35 | 210 D | $\beta-$, $\beta+$ |
| 47 AG$^{109}$ | 9.05 | 2.3 M | $\beta-$ |
| 49 In$^{115}$ | 9.05 | 72 S | $\beta-$, K, $\beta+$ |
| 50 Sn$^{124}$ | 8.50 | 40 M | $\beta-$ |
| 51 Sb$^{121}$ | 9.25 | 17 M | $\beta+$ |
| 55 Cs$^{133}$ | 9.05 | 7.10 | K |
| 59 Pr$^{141}$ | 9.4 | 3.5 M | $\beta+$ |
| 58 Ce$^{142}$ | 7.15 | 33 D | $\beta-$ |
| 60 Nd$^{150}$ | 7.4 | 2 H | $\beta-$ |
| 73 Ta$^{181}$ | 7.6 | 8.2 H | $\beta-$, K |
| 75 Re$^{187}$ | 7.3 | 93 H | $\beta-$, K |
| 79 Au$^{197}$ | 8.1 | 5.60 | $\beta-$ |
| 81 Tl$^{203}$ | 8.8 | 12 D | K |
| 90 Th$^{232}$ | 6.35 | 26 H | $\beta-$ |
| 92 U$^{238}$ | 5.97 | 6.8 D | $\beta-$ |
| 41 Nb$^{93}$ | 8.70 | 21.6 H | |
| *79 Au$^{197}$ | | 7.5 S | $\gamma$ .13 and .28 |
| *45 Rh$^{103\ M}$ | | 57 M | $\gamma$ .04 |
| *49 In$^{115\ M}$ | All around 1 mev | 4.5 H | $\beta-$, $\gamma$ |
| *47 Ag$^{107\ M}$ | | 44.3 S | .094 $\gamma$ + $\beta-$ |
| *47 Ag$^{109\ M}$ | | 39.2 S | .088 $\gamma$ + $\beta-$ |

*Metastable states.

What is claimed is:

1. A method of irradiation checking comprising the steps of including with a material to the irradiated with ionizing radiation a sample of an element having a high level of induced radioactivity together with a short half-life less than the time required for the material to be made available to a consumer and a threshold for induced radioactivity slightly below the level of irradiation desired for said material whereby material irradiation of equal or greater energy than desired induces radioactivity in said sample, and the step of detecting induced radioactivity of said sample following material irradiation as a measure of minimum material irradiation.

2. A method of irradiation checking including the steps defined in claim 1, further characterized by the step of also including with said material a second sample in spaced relation to said first mentioned sample and composed of an element having a half-life less than the time required for the material to be made available to a consumer and a threshold for induced radiation above the desired irradiation level of said material to define with said first mentioned sample a permissible range of material irradiation, and detecting induced radiation of said second sample as an indication of excess material irradiation.

3. Packaging means for materials to be irradiated with ionizing radiation comprising a container including an element having a predetermined threshold energy for induced radiation slightly below the level of irradiation desired for said materials and a short half-life less than the time required for the container to be available for shipment to consumers by an amount commensurate with decay of the induced radiation to a safe level whereby the latter becomes radioactive upon irradiation of package material above said predetermined threshold energy and the presence of radioactivity is indicative of the desired minimum level of irradiation having been received by said materials.

4. Packaging means for materials to be irradiated as defined in claim 3 further characterized by said element being selected from the group consisting of metastable isotopes of gold, rhodium, indium and silver.

References Cited in the file of this patent
UNITED STATES PATENTS

| 2,715,684 | Schwarz | Aug. 16, 1955 |
| 2,738,429 | Goldblith | Mar. 13, 1956 |

OTHER REFERENCES

Recent Advances in Radioactivation Analysis, by A. A. Smales; and Examples of Activation Analysis, by M P. Leveque, from Proceedings of the International Conference on the Peaceful Uses of Atomic Energy, August 8–20, 1955, United Nations Publication 1956, New York, N.Y.; vol. 15, pp. 73–80.